United States Patent
Wang et al.

(10) Patent No.: US 8,614,995 B2
(45) Date of Patent: Dec. 24, 2013

(54) METHOD FOR COMMUNICATION TRANSMISSION

(75) Inventors: Chih Kai Wang, Taichung (TW); Jen Yuan Hsu, Kinmen County (TW); Yu Tao Hsieh, Hsinchu (TW); Pang An Ting, Taichung County (TW)

(73) Assignee: Industrial Technology Research Institute, Chutung, Hsinchu (TW)

( * ) Notice: Subject to any disclaimer, the term of this patent is extended or adjusted under 35 U.S.C. 154(b) by 259 days.

(21) Appl. No.: 12/982,128

(22) Filed: Dec. 30, 2010

(65) Prior Publication Data

US 2012/0147858 A1 Jun. 14, 2012

(30) Foreign Application Priority Data

Dec. 9, 2010 (TW) .............................. 99142944 A

(51) Int. Cl.
*H04J 3/00* (2006.01)
(52) U.S. Cl.
USPC ........................... 370/336; 370/447; 370/461
(58) Field of Classification Search
USPC ......... 370/310, 328, 329, 336, 345, 431, 442, 370/445, 447, 458, 461; 455/403, 422.1, 455/435.1, 435.2
See application file for complete search history.

(56) References Cited

U.S. PATENT DOCUMENTS

| | | | |
|---|---|---|---|
| 2008/0095195 A1 | 4/2008 | Ahmadi et al. | |
| 2008/0107047 A1* | 5/2008 | Olfat | 370/280 |
| 2008/0144612 A1 | 6/2008 | Honkasalo et al. | |
| 2008/0205365 A1* | 8/2008 | Russell et al. | 370/341 |
| 2009/0016375 A1 | 1/2009 | Hsieh et al. | |
| 2009/0122771 A1 | 5/2009 | Cai | |
| 2010/0029325 A1 | 2/2010 | Wang et al. | |
| 2010/0124184 A1 | 5/2010 | Dayal et al. | |
| 2010/0135272 A1* | 6/2010 | Dayal et al. | 370/343 |
| 2010/0142504 A1 | 6/2010 | Bitran et al. | |
| 2010/0197235 A1 | 8/2010 | Wilhelmsson | |
| 2011/0205986 A1* | 8/2011 | Medapalli | 370/329 |

FOREIGN PATENT DOCUMENTS

TW 201012264 A 3/2010
WO WO 2010/065430 A2 6/2010

OTHER PUBLICATIONS

Office Action issued by Taiwan Intellectual Property Office of the R.O.C on Jun. 21, 2013.

* cited by examiner

*Primary Examiner* — Obaidul Huq
(74) *Attorney, Agent, or Firm* — Egbert Law Offices, PLLC

(57) ABSTRACT

A method for communication transmission includes the steps of: performing sub-frame transmission in accordance with a first communication standard and pausing sub-frame transmission in accordance with a second communication standard in a first communication period; performing a sub-frame uplink operation in accordance with the second communication standard and pausing a sub-frame uplink operation in accordance with the first communication standard in a second communication period; and performing a sub-frame downlink operation in accordance with the second communication standard and pausing a sub-frame downlink operation in accordance with the first communication standard in a third communication period. The transmission band of the first communication standard overlaps, at least partially, the transmission band of the second communication standard.

19 Claims, 10 Drawing Sheets

METHOD FOR COMMUNICATION TRANSMISSION

CROSS-REFERENCE TO RELATED APPLICATIONS

Not applicable.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The disclosure relates to a wireless communication system, and particularly to a method for coexistence of different wireless communication systems.

2. Description of Related Art Including Information Disclosed Under 37 CFR 1.97 and 37 CFR 1.98

The current Institute of Electrical and Electronics Engineers (IEEE) 802.16e standard known as WiMax is one kind of wireless metropolitan area network (Wireless-MAN). The IEEE 802.16e standard uses an orthogonal frequency division multiple access (OFDMA) system in its physical layer, has a bandwidth between 1.25 MHz and 20 MHz, and comprises at most 2048 sub-carriers.

The long term evolution (LTE) standard implemented by the third generation partnership project (3GPP) also uses the OFDMA system in its physical layer, and has a bandwidth between 1.4 MHz and 20 MHz. The two aforementioned standards both use the same wireless access system and similar bandwidths. Therefore, an interference issue may occur due to the overlapped channels of these two standards.

FIG. 1 shows a schematic view of a wireless communication system using the IEEE 802.16e standard and the LTE standard. As shown in FIG. 1, the base station BS1 applies the IEEE 802.16e standard, and the base station BS2 applies the LTE standard. The mobile station MS1 is located within the communication range of the base station BS1 but not within the communication range of the base station BS2. The mobile station MS2 is located within the communication range of the base station BS2 but not within the communication range of the base station BS1. Therefore, mobile stations MS1 and MS2 can communicate with base stations BS1 and BS2 respectively without interference between two standards. However, the mobile station MS3 is located within the communication range of the base stations BS1 and BS2, and it may interfere with others or be interfered.

FIG. 2 shows bandwidths of the wireless communication system shown in FIG. 1. As shown in FIG. 2, the base station BS1 uses bandwidth BW1 as its transmission bandwidth, and base station BS2 uses bandwidth BW2 as its transmission bandwidth. In addition, the bandwidth BW1 partially overlaps the bandwidth BW2. Therefore, the mobile station MS3 may interfere with others or be interfered during operation.

With the development of mobile communication systems, the trend of the coexistence of different wireless communication systems is inevitable. Accordingly, there is a need for a method for coexistence of different wireless communication systems; such a method can effectively reduce the interference caused by coexistence of different wireless communication systems. The disclosure provides such a method.

BRIEF SUMMARY OF THE INVENTION

One embodiment discloses a method for communication transmission, comprising the steps of: performing sub-frame transmission in accordance with a first communication standard and pausing sub-frame transmission in accordance with a second communication standard in a first communication period; performing a sub-frame uplink operation in accordance with the second communication standard and pausing a sub-frame uplink operation in accordance with the first communication standard in a second communication period; and performing a sub-frame downlink operation in accordance with the second communication standard and pausing a sub-frame downlink operation in accordance with the first communication standard in a third communication period. The transmission band of the first communication standard overlaps, at least partially, the transmission band of the second communication standard.

Another embodiment discloses a method for communication transmission, comprising the steps of: choosing a reference communication standard from two communication standards that share, at least partially, bandwidth with each other, and using the other communication standard as a subsidiary communication standard; defining a plurality of blank sub-frames from a frame of the reference communication standard as transmission sub-frames of the subsidiary communication standard, wherein uplink sub-frames of the subsidiary communication standard correspond to uplink sub-frames of the plurality of blank sub-frames, and downlink sub-frames of the subsidiary communication standard correspond to downlink sub-frames of the plurality of blank sub-frames; determining the number of uplink sub-frames and the number of downlink sub-frames of the subsidiary communication standard and the interval between the uplink sub-frames and the downlink sub-frames of the subsidiary communication standard according to the plurality of blank sub-frames, such that the number of symbols of the uplink sub-frames and the number of symbols of the downlink sub-frames of the subsidiary communication standard and the transition gaps between the uplink sub-frames and the downlink sub-frames of the subsidiary communication standard conform to the subsidiary communication standard; and performing sub-frame transmission in accordance with the subsidiary communication standard in the plurality of blank sub-frames of the reference communication standard and performing sub-frame transmission in accordance with the reference communication standard in the other sub-frames of the reference communication standard.

BRIEF DESCRIPTION OF THE SEVERAL VIEWS OF THE DRAWINGS

The accompanying drawings, which are incorporated in and constitute a part of this specification, illustrate embodiments of the disclosure and, together with the description, serve to explain the principles of the invention.

DETAILED DESCRIPTION OF THE INVENTION

The present disclosure relates to a method for coexistence of different wireless communication systems. One communication standard is first defined as the reference communication standard. The structures of the uplink and downlink sub-frames of another communication standard are adjusted according to the reference communication standard to reduce the likelihood of interference.

Figure 1:
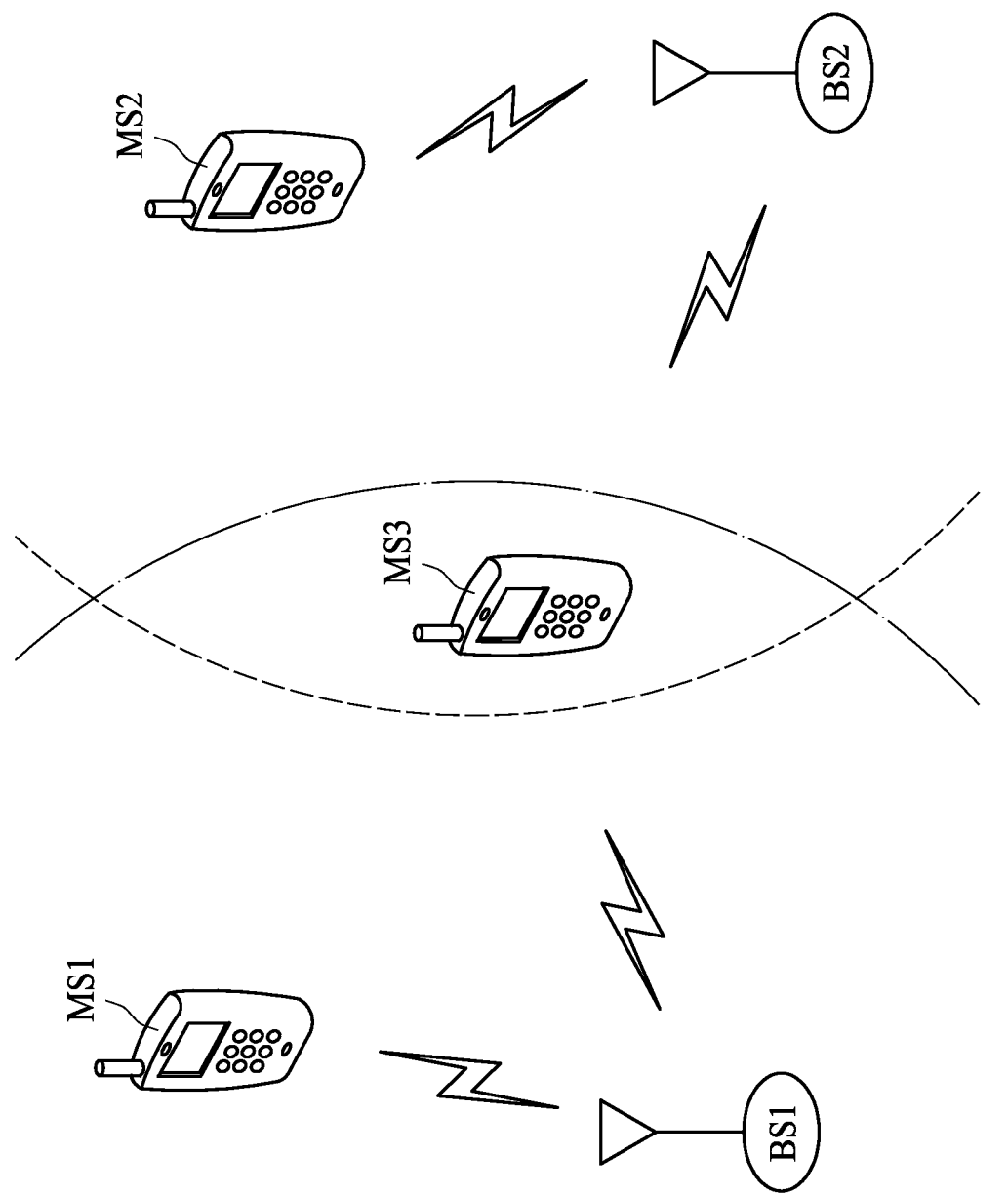
FIG. 1 shows a schematic view of the coexistence of two wireless communication systems with different standards.
Figure 2:
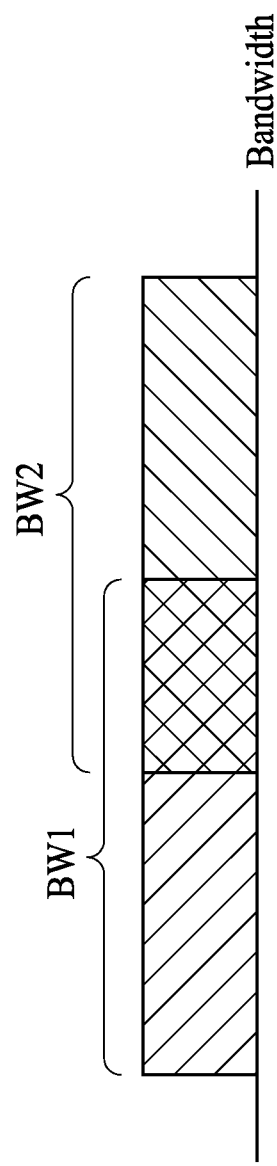
FIG. 2 shows the used bandwidths of the coexistence of two wireless communication systems with different standards.
Figure 3:
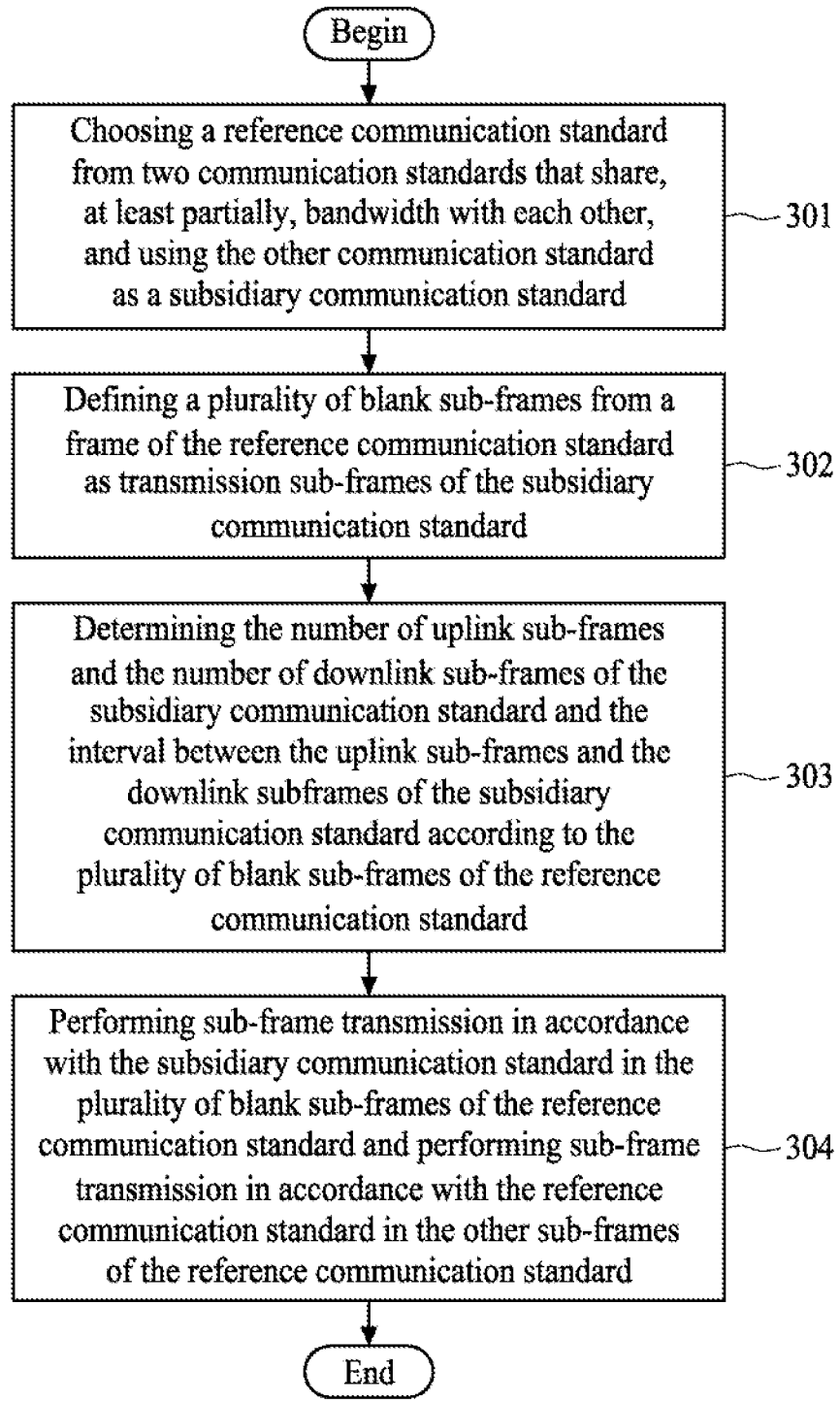
FIG. 3 is a flowchart illustrating an exemplary embodiment of a method for communication transmission.

FIG. 3 is a flowchart illustrating an exemplary embodiment of a method for communication transmission. In step 301, one communication standard is chosen as a reference communication standard from two communication standards that share, at least partially, bandwidth with each other, the other communication standard is used as a subsidiary communication standard, and step 302 is executed. In step 302, a plurality of blank sub-frames from a frame of the reference communication standard are defined as transmission sub-frames of the subsidiary communication standard, wherein the uplink sub-frames of the subsidiary communication standard correspond to the uplink sub-frames of the plurality of blank sub-frames, and the downlink sub-frames of the subsidiary communication standard correspond to the downlink sub-frames of the plurality of blank sub-frames, and step 303 is executed. In step 303, the number of uplink sub-frames and the number of downlink sub-frames of the subsidiary communication standard and the interval between the uplink sub-frames and the downlink sub-frames of the subsidiary communication standard are determined according to the plurality of blank sub-frames such that the number of symbols of the uplink sub-frames and the number of symbols of the downlink sub-frames of the subsidiary communication standard and the transition gap between the uplink sub-frames and the downlink sub-frames of the subsidiary communication standard conform to the subsidiary communication standard, and step 304 is executed. In step 304, sub-frame transmission in accordance with the subsidiary communication standard are performed in the plurality of blank sub-frames of the reference communication standard, and sub-frame transmission in accordance with the reference communication standard are performed in the other sub-frames of the reference communication standard, and the current method is finished.

Figure 4:
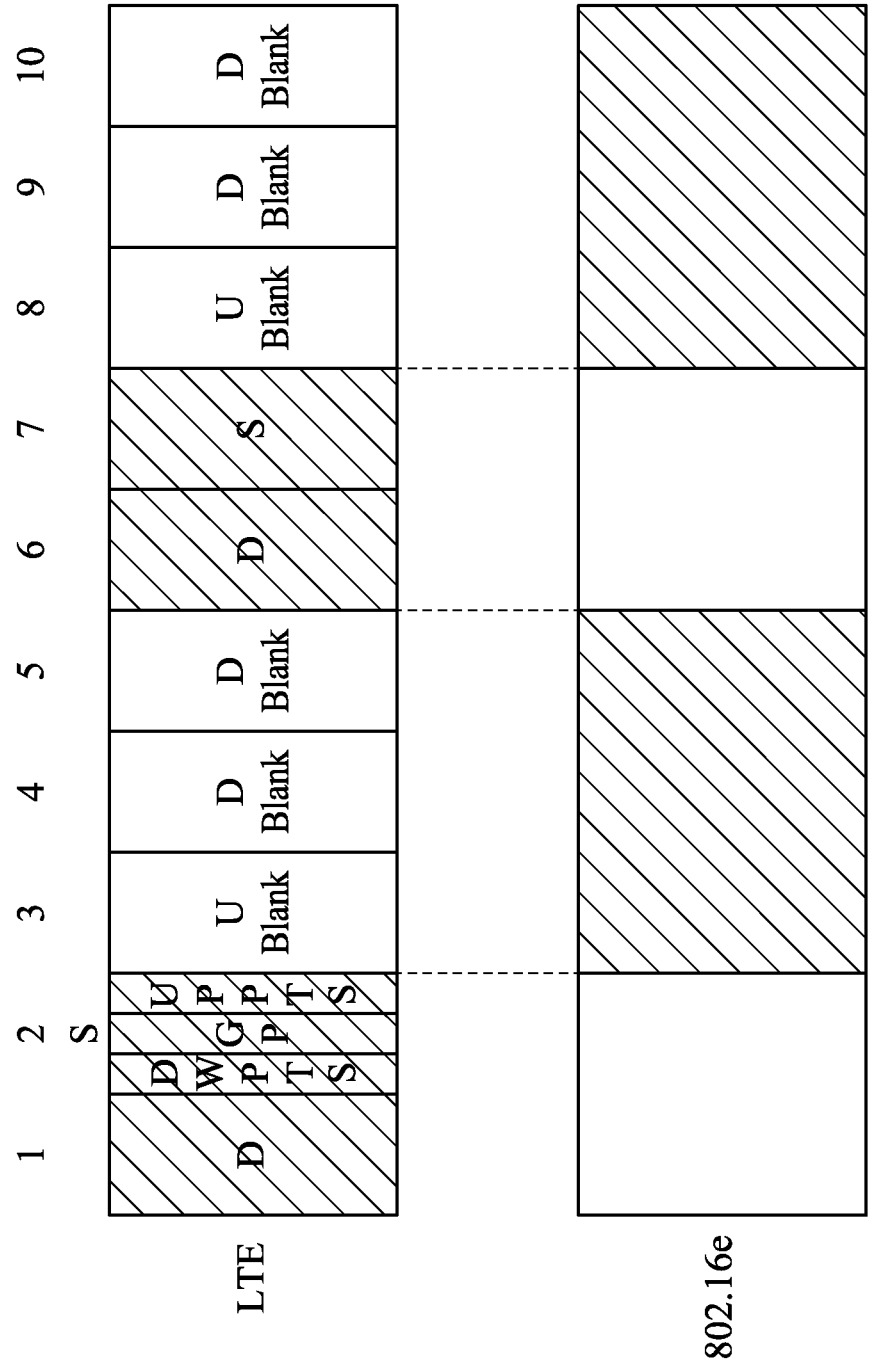
FIG. 4 shows the frame structures of the coexistence of the IEEE 802.16e standard and the LTE standard according to an exemplary embodiment.

The upper part of FIG. 4 shows a frame structure according to the LTE standard. As shown in FIG. 4, the frame structure comprises ten sub-frames, wherein the duration of each sub-frame is one microsecond. The D sub-frames shown in FIG. 4 are downlink sub-frames, the U sub-frames shown in FIG. 4 are uplink sub-frames, and the S sub-frames shown in FIG. 4 are special sub-frames. Each S sub-frame comprises a downlink time slot DwPTS, a guard interval GP, and an uplink time slot UpPTS. To enable the LTE standard to coexist with the IEEE 802.16e standard, the method for communication transmission shown in FIG. 3 can be applied. For example, in step 301 the LTE standard shown in FIG. 4 is chosen as the reference communication standard, while the IEEE 802.16e standard is chosen as the subsidiary communication standard. In step 302, the 3rd sub-frame, the 4th sub-frame, the 5th sub-frame, the 8th sub-frame, the 9th sub-frame and the 10th sub-frame of the reference communication standard are defined as blank sub-frames, while the 1st sub-frame, the 2nd sub-frame, the 6th sub-frame and the 7th sub-frame of the reference communication standard are non-blank sub-frames. In step 303, the number of uplink sub-frames and the number of downlink sub-frames of the IEEE 802.16e standard, the number of symbols of the uplink sub-frames and the number of symbols of the downlink sub-frames of the IEEE 802.16e standard and the transition gap between the uplink sub-frames and the downlink sub-frames of the IEEE 802.16e standard are determined according to the defined blank sub-frames. In step 304, the communication transmission is carried out according to the defined frame structure.

The lower part of FIG. 4 shows the defined frame structure of the IEEE 802.16e standard. Since the structure of the second-half frame is the same as the structure of the first-half frame in LTE standard, only the first-half frame is described below. The combination of the 1st sub-frame and the 2nd sub-frame of the LTE standard is defined as a 1st communication period. In the 1st communication period, downlink operations in accordance with the LTE standard can be performed in the 1st sub-frame and the DwPTS time slot of the 2nd sub-frame, and uplink operations in accordance with the LTE standard can be performed in the UpPTS time slot of the 2nd sub-frame. Meanwhile, the 1st communication period is defined as the transmit/receive transition gap (TTG) of the IEEE 802.16e standard such that the transmission operations in accordance with the IEEE 802.16e standard are paused. The 3rd sub-frame of the LTE standard is defined as the 2nd communication period. In the 2nd communication period, the uplink operation in accordance with the LTE standard is paused. Meanwhile, in the 2nd communication period, an uplink operation in accordance with the IEEE 802.16e standard is performed. The 4th sub-frame and the 5th sub-frame of the LTE standard are defined as the 3rd communication period. In the 3rd communication period, the downlink operation in accordance with the LTE standard is paused. Meanwhile, in the 3rd communication period, a downlink operation in accordance with the IEEE 802.16e standard is performed. It should be noted that the transmission operations in accordance with the IEEE 802.16e standard are paused at the end portion of the 2nd communication period and at the start portion of the 3rd communication period. The duration of the combined portions, which is shorter than the length of a sub-frame of the LTE standard, can be defined as the receive/transmit transition gap (RTG) of the IEEE 802.16e standard.

In some embodiments of this disclosure, a 4th communication period corresponding to a non-blank sub-frame can be defined between the 2nd communication period and the 3rd communication period. In the 4th communication period, an uplink or downlink operation in accordance with the LTE standard is performed and the transmission operations in accordance with the IEEE 802.16e standard are paused.

In some embodiments of this disclosure, a 5th communication period corresponding to a non-blank sub-frame can be defined after the 3rd communication period. In the 5th communication period, a downlink operation in accordance with the LTE standard is performed and the transmission operations in accordance with the IEEE 802.16e standard are paused.

As shown in FIG. 4, according to the method for communication transmission in accordance with the exemplary embodiments of this disclosure, the sub-frames of the reference communication standard are aligned with the sub-frames of the subsidiary communication standard. In addition, the downlink operations in accordance with the subsidiary communication standard are performed only on the downlink sub-frames of the reference communication standard, and the uplink operations in accordance with the subsidiary communication standard are performed only on the uplink sub-frames of the reference communication standard. Accordingly, there is no interference occurring between the reference communication standard and the subsidiary communication standard. The frame structure of the reference communication standard does not need to be adjusted, and only the transition gap of the subsidiary communication standard requires adjustment.

Figure 5:
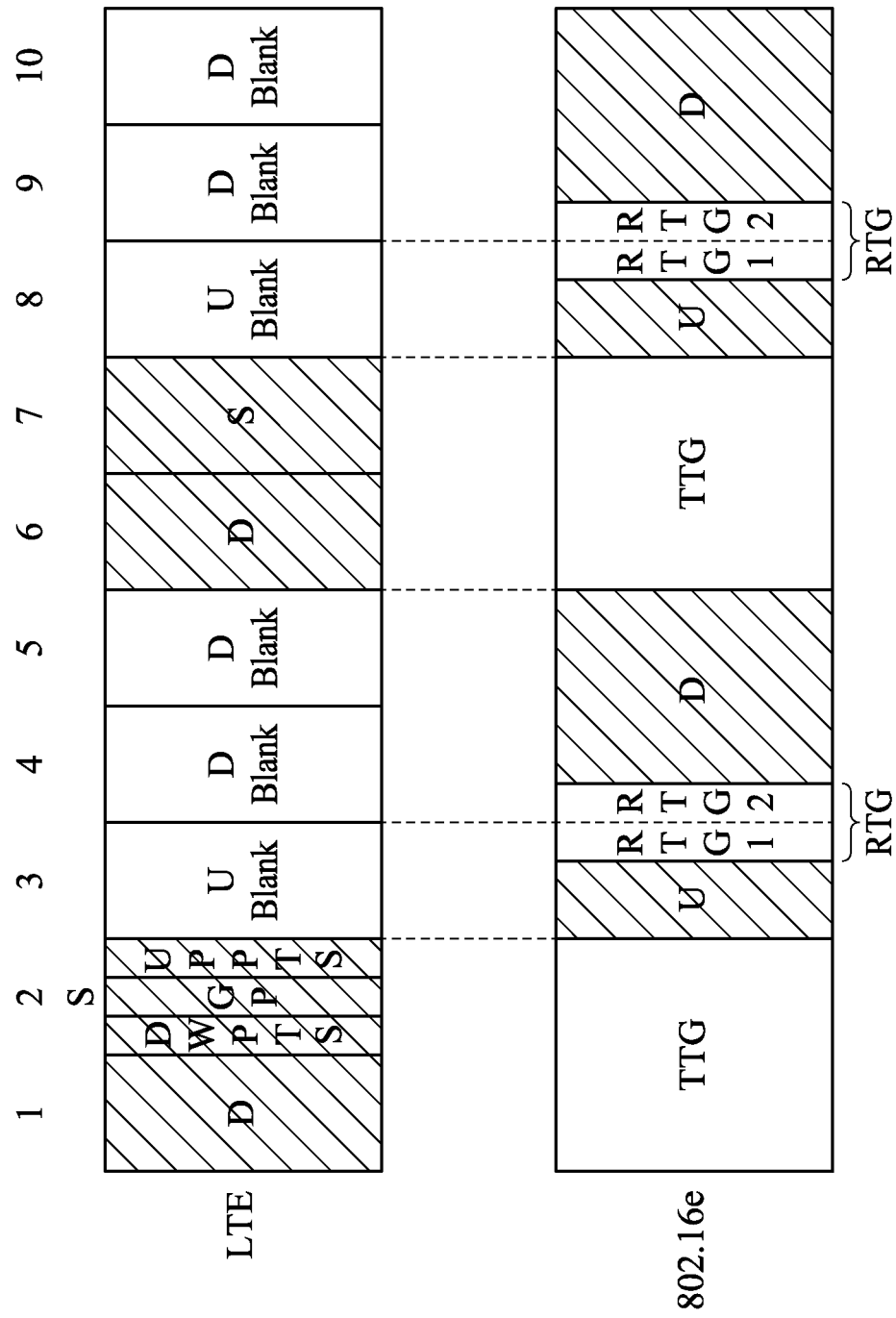
FIG. 5 shows the frame structures of the coexistence of the IEEE 802.16e standard and the LTE standard according to another exemplary embodiment.

The upper part of FIG. 4 shows only one type of frame structure according to the LTE standard. The upper part of FIG. 5 shows another frame structure according to the LTE standard. The following further illustrates how to determine the number of uplink sub-frames and the number of downlink sub-frames of the subsidiary communication standard, and the interval between the uplink sub-frames and the downlink sub-frames of the subsidiary communication standard according to the plurality of blank sub-frames such that the number of symbols of the uplink and downlink sub-frames of the subsidiary communication standard, and the transition gaps between the uplink sub-frames and the downlink sub-frames of the subsidiary communication standard conform to the subsidiary communication standard. In this exemplary embodiment, the LTE standard is defined as the reference communication standard, and the IEEE 802.16e standard is defined as the subsidiary communication standard. The frame structures of the IEEE 802.16e standard can be categorized into a combination of a big TTG and a big RTG or a combination of a big TTG and a small RTG, wherein the big TTG denotes that the duration of the interval from the uplink sub-frames to the downlink sub-frames of the IEEE 802.16e standard is equal to or greater than the duration of a sub-frame of the LTE standard and the big RTG denotes that the duration of the interval from the downlink sub-frames to the uplink sub-frames of the IEEE 802.16e standard is equal to or greater than the duration of a sub-frame of the LTE standard, while the small RTG denotes that the duration of the interval from the downlink sub-frames to the uplink sub-frames of the IEEE 802.16e standard is less than the duration of a sub-frame of the LTE standard. The frame structure of the IEEE 802.16e standard shown in the lower part of FIG. 4 is a combination of a big TTG and a small RTG.

The frame structure of the LTE standard comprises ten sub-frames, and could be divided into a first-half frame and a second-half frame, wherein each half frame comprises five sub-frames. The number of the blank sub-frames is denoted as n and the number of the non-blank sub-frames is denoted as 5-n. Moreover, n=n1+n2, where n1 denotes the number of downlink sub-frames of the IEEE 802.16e standard and n2 denotes the number of the uplink sub-frames of the IEEE 802.16e standard. Furthermore, the length of a sub-frame of the LTE standard is denoted as L, the symbol length of the IEEE 802.16e standard is denoted as M, the maximum available downlink number of the IEEE 802.16e standard is denoted as ND and the maximum available uplink number of the IEEE 802.16e standard is denoted as NU.

If the frame structure of the IEEE 802.16e standard is defined as a combination of a big TTG and a small RTG, the following equations can be formulated:

$$M*(1+2*ND)+RTG1=L*n1,$$

$$M*(1+3*NU)+RTG2=L*n2, \text{ and}$$

$$RTG1+RTG2=RTG,$$

wherein RTG1 denotes the remaining time in a downlink sub-frame of the IEEE 802.16e standard, RTG2 denotes the remaining time in an uplink sub-frame of the IEEE 802.16e standard, and RTG, which is the combination of RTG1 and RTG2, is the receive/transmit transition gap of the IEEE 802.16e standard. The number one in parentheses represents the downlink preamble or the uplink ranging symbol in IEEE 802.16e standard. The multiple of ND by two represents that each downlink slot contains at least two downlink symbols, and the multiple of NU by three represents that each uplink slot contains at least three uplink symbols.

If the 3rd sub-frame, the 4th sub-frame, the 5th sub-frame, the 8th sub-frame, the 9th sub-frame and the 10th sub-frame of the LTE standard are defined as the blank sub-frames, then n equals three. Take FIG. 5 for example. It can be derived from the upper part of FIG. 5 that n1=2 and n2=1. Accordingly, it can be obtained that:

$$M*(1+2*ND)+RTG1=2L,$$

$$M*(1+3*NU)+RTG2=L, \text{ and}$$

$$RTG1+RTG2=RTG.$$

Referring to the lower part of FIG. 5, it shows the defined frame structure of the IEEE 802.16e standard. If the IEEE 802.16e frame structure conforms to architecture constraints of 10 MHz and ⅛ cyclic prefix, then M equals 288 PS, and L equals 2800 PS, wherein PS is the sampling time multiplied by four. Accordingly, the maximum value of ND is nine, and the maximum value of NU is two. By substituting the maximum value of ND and the maximum value of NU into the above functions, it can be obtained that RTG1 is 128, RTG2 is 884, and RTG is 912. If the IEEE 802.16e frame structure conforms to architecture constraints of 10 MHz and 1/16 cyclic prefix, then M equals 272 PS, and L equals 2800 PS. Accordingly, the maximum value of ND is nine, and the maximum value of NU is three. By substituting the maximum value of ND and the maximum value of NU into the above functions, it can be obtained that RTG1 is 432, RTG2 is 80, and RTG is 512.

Figure 6:
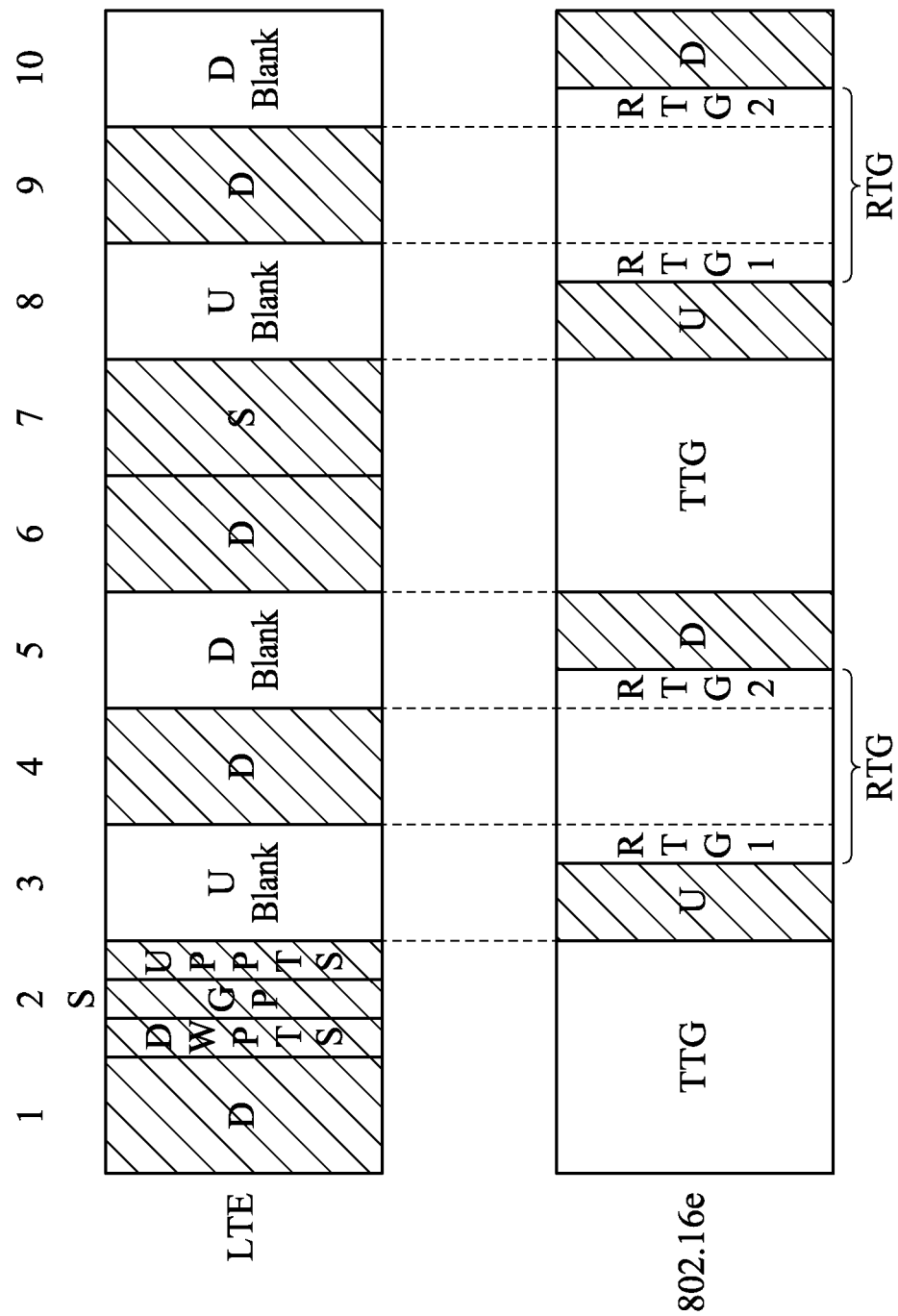
FIG. 6 shows the frame structures of the coexistence of the IEEE 802.16e standard and the LTE standard according to yet another exemplary embodiment.

If the frame structure of the IEEE 802.16e standard is defined as a combination of a big TTG and a big RTG, the following functions should be applied:

$$M*(1+2*ND)+RTG1=L*n1,$$

$$M*(1+3*NU)+RTG2=L*n2, \text{ and}$$

$$RTG1+RTG2+L=RTG,$$

wherein the 3rd function denotes that the length of RTG is equal to or longer than the length of a sub-frame of the LTE standard. The upper part of FIG. 6 shows another frame structure according to the LTE standard. The lower part of FIG. 6 shows the defined frame structure of the IEEE 802.16e standard, which is a combination of a big TTG and a big RTG. As shown in FIG. 6, the RTG of the IEEE 802.16e standard is a combination of RTG1, RTG2 and a full sub-frame of the LTE standard, wherein the full sub-frame of the LTE standard corresponds to the 4th communication period.

Figure 7:
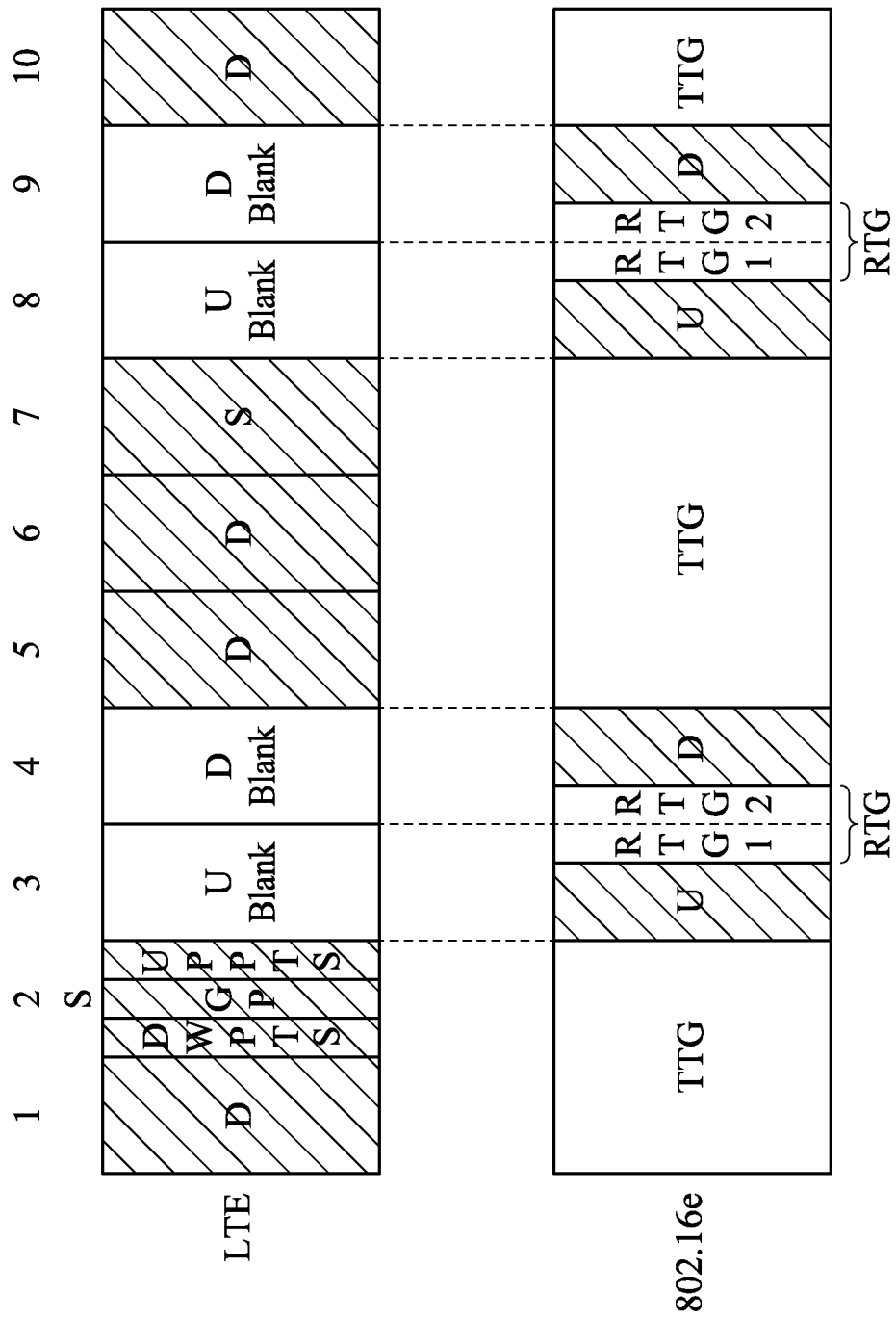
FIG. 7 shows the frame structures of the coexistence of the IEEE 802.16e standard and the LTE standard according to yet another exemplary embodiment.

The upper part of FIG. 7 shows another frame structure according to the LTE standard. The lower part of FIG. 7 shows the defined frame structure of the IEEE 802.16e standard, which is a combination of a big TTG and a small RTG. As shown in FIG. 7, the TTG of the IEEE 802.16e standard is a combination of non-blank sub-frames of the LTE standard, wherein the sub-frame after the 3rd communication period corresponds to the 5th communication period.

Figure 8:
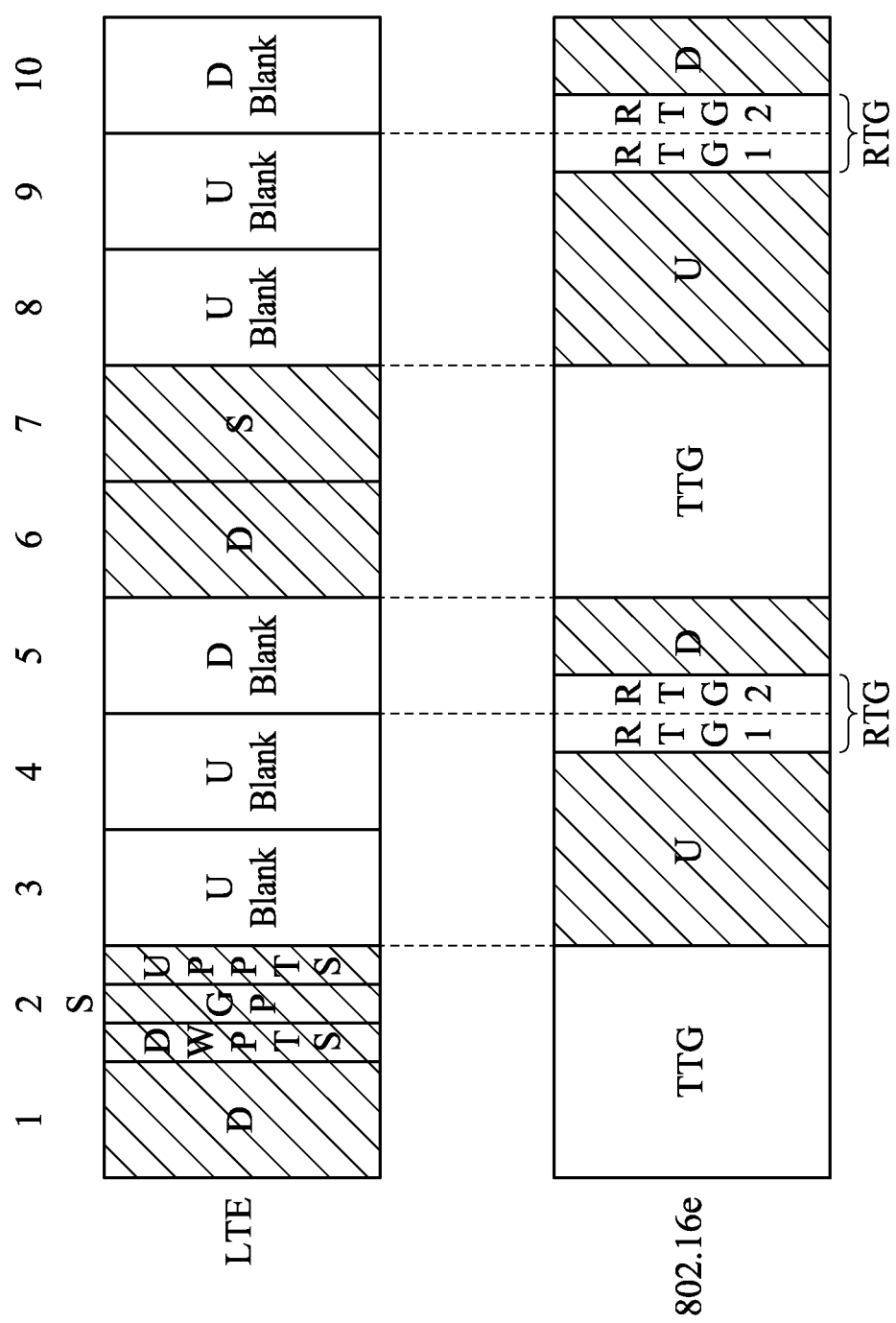
FIG. 8 shows the frame structures of the coexistence of the IEEE 802.16e standard and the LTE standard according to yet another exemplary embodiment.

The upper part of FIG. 8 shows another frame structure according to the LTE standard. In contrast to the downlink sub-frames shown in the frame structure in the upper part of FIG. 5, the 4th and 8th sub-frames of the frame structure shown in the upper part of FIG. 8 are uplink sub-frames. The lower part of FIG. 8 shows the defined frame structure of the IEEE 802.16e standard, which is a combination of a big TTG and a small RTG.

Figure 9:
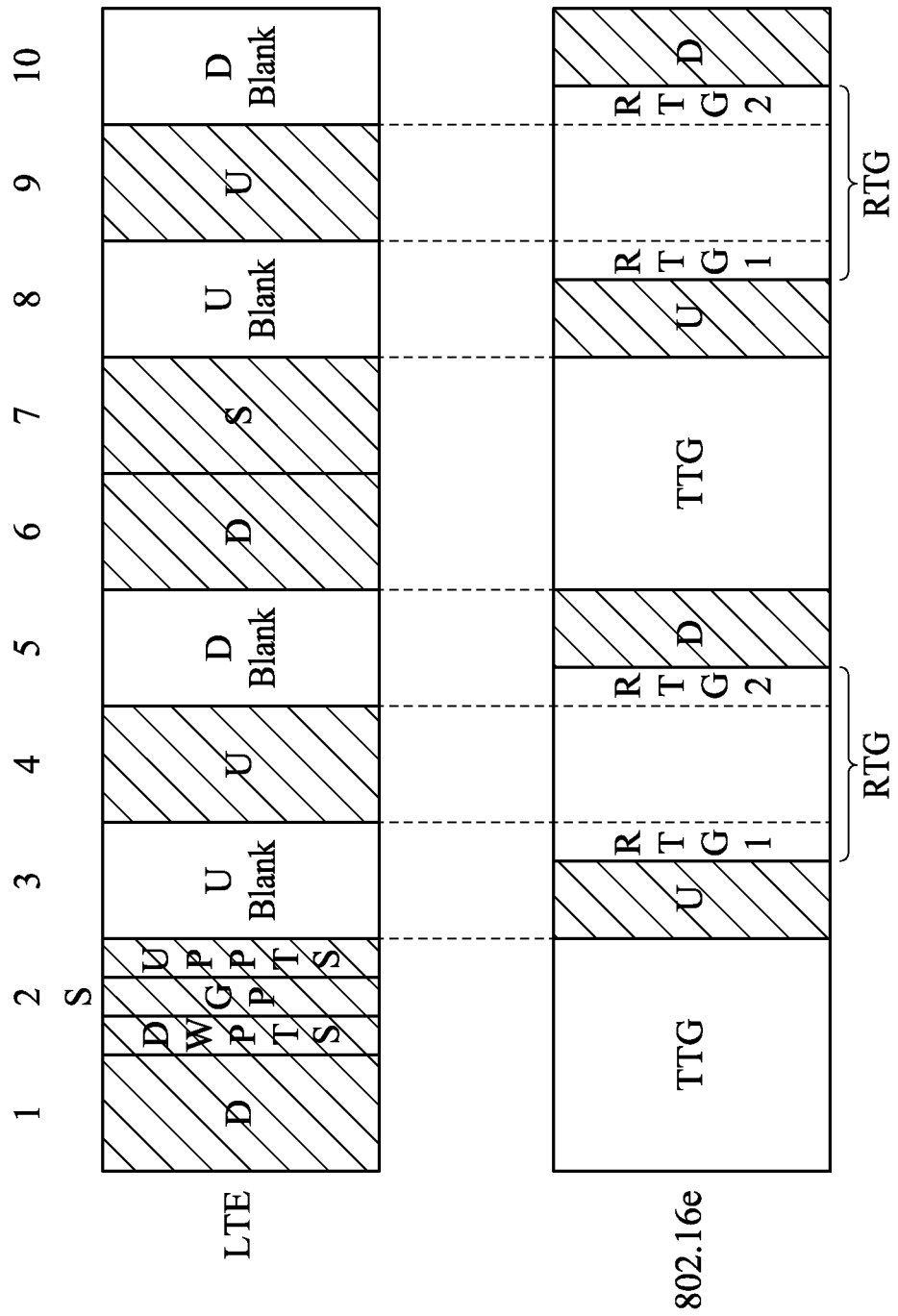
FIG. 9 shows the frame structures of the coexistence of the IEEE 802.16e standard and the LTE standard according to yet another exemplary embodiment.

The upper part of FIG. 9 shows another frame structure according to the LTE standard, which is the same frame structure as that shown in the upper part of FIG. 8. The lower part of FIG. 9 shows the defined frame structure of the IEEE 802.16e standard, which is a combination of a big TTG and a big RTG. As shown in FIG. 9, the RTG of the IEEE 802.16e standard is a combination of RTG1, RTG2 and a full sub-frame of the LTE standard, wherein the full sub-frame of the LTE standard corresponds to the 4th communication period.

Figure 10:
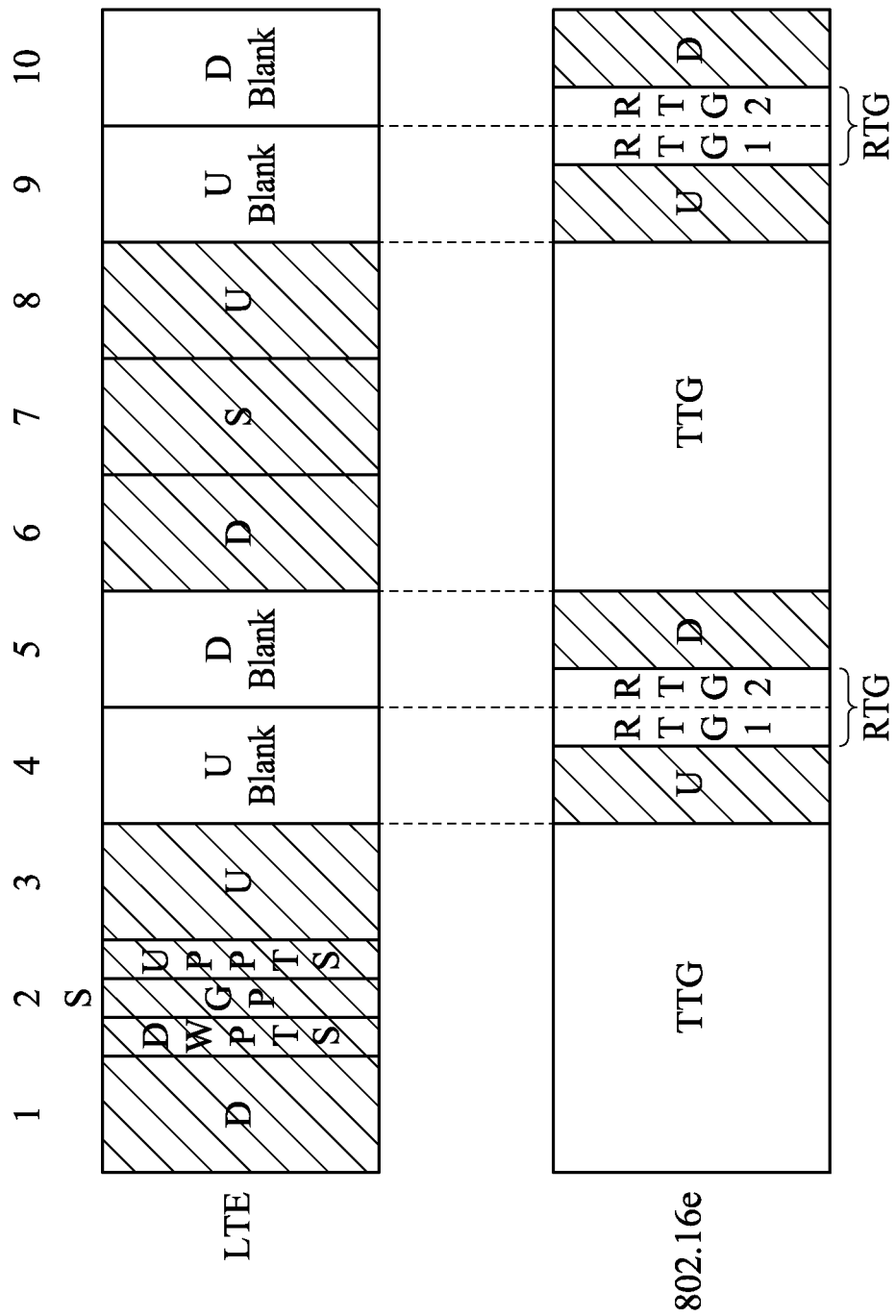
FIG. 10 shows the frame structures of the coexistence of the IEEE 802.16e standard and the LTE standard according to yet another exemplary embodiment.

The upper part of FIG. 10 shows another frame structure according to the LTE standard, which is the same frame structure as that shown in the upper part of FIG. 8. The lower part of FIG. 9 shows the defined frame structure of the IEEE 802.16e standard, which is a combination of a big TTG and a small RTG. As shown in FIG. 10, the TTG of the IEEE 802.16e standard is a combination of non-blank sub-frames of the LTE standard, wherein the combination of non-blank sub-frames corresponds to the 1st communication period.

In conclusion, the method for communication transmission of this disclosure first defines one communication standard as the reference communication standard, and then defines another communication standard as the subsidiary communication standard. Accordingly, the frame structures of the uplink sub-frames and the downlink sub-frames of the subsidiary communication standard can be adjusted according to the reference communication standard. Meanwhile, the frame structures can be defined such that they conform to the reference communication standard and the subsidiary communication standard. In addition, all of the possible frame structures can be stored for all kinds of applications. Since the uplink sub-frames of the subsidiary communication standard correspond to the uplink sub-frames of the reference communication standard, and the downlink sub-frames of the subsidiary communication standard correspond to the downlink sub-frames of the reference communication standard, the interference between the reference communication standard and the subsidiary communication standard can be reduced. Further, the frame structure of the reference communication standard does not need to be adjusted; only the transition gap of the subsidiary communication standard requires adjustments.

The above-described exemplary embodiments are intended to be illustrative only. Those skilled in the art may devise numerous alternative embodiments without departing from the scope of the following claims.

We claim:

1. A method for communication transmission, the method comprising the steps of:
   performing a sub-frame transmission in accordance with a first communication standard and pausing the sub-frame transmission in accordance with a second communication standard in a first communication period;
   performing a sub-frame uplink operation in accordance with the second communication standard and pausing the sub-frame uplink operation in accordance with the first communication standard in a second communication period;
   performing a sub-frame downlink operation in accordance with the second communication standard and pausing the sub-frame downlink operation in accordance with the first communication standard in a third communication period;
   wherein the transmission band of the first communication standard overlaps at least partially the transmission band of the second communication standard; and
   performing the sub-frame uplink or the sub-frame downlink operation in accordance with the first communication standard and pausing the sub-frame transmission in accordance with the second communication standard in a fourth communication period;
   wherein the fourth communication period is between the second communication period and the third communication period.

2. The method of claim 1, further comprising the step of:
   performing the sub-frame downlink operation in accordance with the first communication standard and pausing the sub-frame transmission in accordance with the second communication standard in a fifth communication period;
   wherein the fifth communication period is after the third communication period.

3. The method of claim 2, wherein the duration of the fifth communication period is an integral multiple of the duration of a sub-frame of the first communication standard.

4. The method of claim 1, wherein two sub-frames are transmitted in accordance with the first communication standard in the first communication period.

5. The method of claim 4, wherein the downlink sub-frame and a special sub-frame are transmitted in accordance with the first communication standard in the first communication period.

6. The method of claim 1, wherein at least four uplink symbols are contained in accordance with the second communication standard in the second communication period.

7. The method of claim 1, wherein in the second communication period, the sub-frame uplink operation in accordance with the second communication standard is first proceeded, and then the sub-frame uplink operation in accordance with the second communication standard is paused.

8. The method of claim 1, wherein at least three downlink symbols are contained in accordance with the second communication standard in the third communication period.

9. The method of claim 1, wherein in the third communication period, the sub-frame downlink operation in accordance with the first communication standard is first paused, and then the sub-frame downlink operation in accordance with the second communication standard is resumed.

10. The method of claim 1, wherein the durations of the first communication period, the second communication period and the third communication period are integral multiples of the duration of a sub-frame of the first communication standard.

11. The method of claim 1, wherein the duration of the fourth communication period is an integral multiple of the duration of a sub-frame of the first communication standard.

12. The method of claim 1, wherein the first communication standard is a long term evolution (LTE) standard.

13. The method of claim 1, wherein the second communication standard is an Institute of Electrical and Electronics Engineers (IEEE) 802.16e standard.

14. A method for communication transmission, the method comprising the steps of:
- choosing a reference communication standard from two communication standards that at least partially share bandwidth with each other, and using the other communication standard as a subsidiary communication standard;
- defining a plurality of blank sub-frames from a frame of the reference communication standard as transmission sub-frames of the subsidiary communication standard, wherein uplink sub-frames of the subsidiary communication standard correspond to uplink sub-frames of the plurality of blank sub-frames, and downlink sub-frames of the subsidiary communication standard correspond to downlink sub-frames of the plurality of blank sub-frames;
- determining the number of uplink sub-frames and the number of downlink sub-frames of the subsidiary communication standard and an interval between the uplink sub-frames and the downlink sub-frames of the subsidiary communication standard according to the plurality of blank sub-frames such that the number of symbols of the uplink and downlink sub-frames of the subsidiary communication standard; and a transition gap between the uplink sub-frames and the downlink sub-frames of the subsidiary communication standard; conform to the subsidiary communication standard; and
- performing a sub-frame transmission in accordance with the subsidiary communication standard in the plurality of blank sub-frames of the reference communication standard and performing a sub-frame transmission in accordance with the reference communication standard in the other sub-frames of the reference communication standard.

15. The method of claim 14, wherein the duration of the interval from the uplink sub-frames to the downlink sub-frames of the subsidiary communication standard is equal to or greater than the duration of a sub-frame of the reference communication standard.

16. The method of claim 14, wherein the duration of the interval from the downlink sub-frames to the uplink sub-frames of the subsidiary communication standard is equal to or greater than the duration of a sub-frame of the reference communication standard.

17. The method of claim 14, wherein the duration of the interval from the downlink sub-frames to the uplink sub-frames of the subsidiary communication standard is smaller than the duration of the length of a sub-frame of the reference communication standard.

18. The method of claim 14, wherein the reference communication standard is a long term evolution (LTE) standard.

19. The method of claim 14, wherein the subsidiary communication standard is an Institute of Electrical and Electronics Engineers (IEEE) 802.16e standard.

\* \* \* \* \*